United States Patent
Hofmann et al.

(10) Patent No.: US 10,754,157 B2
(45) Date of Patent: *Aug. 25, 2020

(54) OPTICAL ELEMENT

(71) Applicant: Carl Zeiss Smart Optics GmbH, Aalen (DE)

(72) Inventors: Jens Hofmann, Jena (DE); Gerhard Kelch, Aalen (DE); Wolf Krause, Essingen (DE); Joerg Puetz, Aalen (DE); Georg Michels, Aalen (DE)

(73) Assignee: tooz technologies GmbH, Aalen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/550,773

(22) PCT Filed: Feb. 11, 2016

(86) PCT No.: PCT/EP2016/052917
§ 371 (c)(1),
(2) Date: Aug. 12, 2017

(87) PCT Pub. No.: WO2016/128512
PCT Pub. Date: Aug. 18, 2016

(65) Prior Publication Data
US 2018/0031840 A1   Feb. 1, 2018

(30) Foreign Application Priority Data
Feb. 12, 2015 (DE) .................. 10 2015 102 032

(51) Int. Cl.
*G02B 27/01* (2006.01)
*G02B 5/18* (2006.01)
(Continued)

(52) U.S. Cl.
CPC ............ *G02B 27/0172* (2013.01); *B32B 7/12* (2013.01); *B32B 37/12* (2013.01); *G02B 5/18* (2013.01);
(Continued)

(58) Field of Classification Search
CPC ................ G02B 27/01; G02B 27/0101; G02B 27/0103; G02B 27/0149; G02B 27/017;
(Continued)

(56) References Cited

U.S. PATENT DOCUMENTS

| 8,665,178 B1 | 3/2014 | Wang |
| 2004/0165637 A1* | 8/2004 | Bullington ............... G02B 6/34 |
| | | 372/50.11 |

(Continued)

FOREIGN PATENT DOCUMENTS

| CN | 102043502 A | 5/2011 |
| CN | 103688208 A | 3/2014 |

(Continued)

OTHER PUBLICATIONS

English translation of the International Preliminary Report on Patentability rendered by the International Bureau of WIPO for PCT/EP2016/052917, dated May 12, 2016, 9 pages.

*Primary Examiner* — Travis S Fissel
(74) *Attorney, Agent, or Firm* — Skaar Ulbrich Macari, P.A.

(57) ABSTRACT

A method for producing an optical element includes a) providing a first shell which is transparent in the predetermined wavelength range, b) applying a coating which is optically effective for the predetermined wavelength range onto the structured portion, c) providing a second shell which is transparent in the predetermined wavelength range, which shell has an integral embodiment and a smooth lower side which has a complementary form to the form of the (Continued)

upper side, d) applying an adhesive layer which is transparent in the predetermined wavelength range onto the upper side of the first shell and/or the lower side of the second shell, and e) connecting the upper side of the first shell with the lower side of the second shell by means of the adhesive layer such that a two-shell optical element is produced, in which the optically effective structure is buried.

11 Claims, 3 Drawing Sheets

(51) Int. Cl.
    *B32B 7/12* (2006.01)
    *B32B 37/12* (2006.01)
    *G02C 7/02* (2006.01)

(52) U.S. Cl.
    CPC ............ *G02B 5/1861* (2013.01); *G02C 7/02* (2013.01); *B32B 2307/412* (2013.01); *G02B 2027/0125* (2013.01); *G02B 2027/0178* (2013.01); *G02B 2027/0194* (2013.01); *G02C 2202/16* (2013.01)

(58) Field of Classification Search
    CPC ............ G02B 27/0172; G02B 27/0176; G02B 27/0179; G02B 27/0189; G02B 2027/0112; G02B 2027/0114; G02B 2027/0116; G02B 2027/0118; G02B 2027/012; G02B 2027/0121; G02B 2027/0123; G02B 2027/0125
    USPC .................. 359/618, 619, 630–638
    See application file for complete search history.

(56) References Cited

U.S. PATENT DOCUMENTS

| | | | |
|---|---|---|---|
| 2006/0228073 A1* | 10/2006 | Mukawa | G02B 6/0033 385/31 |
| 2010/0304151 A1 | 12/2010 | Tuennermann et al. | |
| 2011/0280515 A1* | 11/2011 | Black | B82Y 20/00 385/31 |
| 2012/0002294 A1* | 1/2012 | Dobschal | G02B 27/0172 359/630 |
| 2012/0120493 A1* | 5/2012 | Simmonds | G02B 6/0026 359/566 |
| 2012/0218481 A1* | 8/2012 | Popovich | G02B 5/1819 349/11 |
| 2014/0043850 A1* | 2/2014 | Thompson | G02B 6/0035 362/607 |
| 2015/0086163 A1* | 3/2015 | Valera | G02B 6/0035 385/37 |
| 2015/0241619 A1* | 8/2015 | Richards | G02B 6/0045 362/607 |
| 2017/0184851 A1 | 6/2017 | Lindig et al. | |
| 2017/0192238 A1 | 7/2017 | Riedel et al. | |

FOREIGN PATENT DOCUMENTS

| | | |
|---|---|---|
| DE | 102014207492 A1 | 10/2015 |
| WO | 9321010 A1 | 10/1993 |
| WO | 2012088478 A1 | 6/2012 |
| WO | 2013116745 A1 | 8/2013 |
| WO | 2016046125 A2 | 3/2016 |

* cited by examiner

OPTICAL ELEMENT

PRIORITY

This application claims the benefit of German Patent Application No. 102015102032.7 filed on Feb. 12, 2015, which is hereby incorporated herein by reference in its entirety.

FIELD

The present invention relates to a method for producing an optical element which is transparent in a predetermined wavelength range and in which an optically effective structure is embedded.

BACKGROUND

Such an optical element can be used e.g. as a spectacle lens for a display device that can be fitted on the head of a user and generates an image, wherein the optical element can be part of an imaging optical system of the display device and the imaging optical system, when the display device is fitted on the user's head, images the generated image such that the user can perceive it as a virtual image.

There is increasingly a need to be able to produce such an optical element with a buried optically effective structure in large quantities and with high accuracy.

SUMMARY

An object of the invention includes providing a method for producing an optical element which is transparent in a predetermined wavelength range and in which an optically effective structure is embedded, which method makes it possible to produce the optical element with high quality in large quantities.

The disclosure includes a method for producing an optical element which is transparent in a predetermined wavelength range and in which an optically effective structure is embedded, which method comprises the following steps:
a) providing a first shell which is transparent in the predetermined wavelength range and which is formed in one piece and comprises a structured section on its upper side,
b) applying a coating which is effective in the predetermined wavelength range onto the structured section in order to form the optically effective structure,
c) providing a second shell which is transparent in the predetermined wavelength range and which is formed in one piece and comprises a smooth lower side which has a shape that complements the shape of the upper side,
d) applying an adhesive layer which is transparent in the predetermined wavelength range onto the upper side of the first shell and/or the lower side of the second shell and
e) joining the upper side of the first shell to the lower side of the second shell by means of the adhesive layer, with the result that a two-shell optical element is produced in which the optically effective structure is buried or embedded.

With this method according to certain embodiments of the invention, the optical element with only two shells (in particular with precisely two shells) can be produced with the desired accuracy in large quantities.

In particular, the first and second shells can be provided in steps a) and c) in each case as dimensionally stable shells. By a dimensionally stable shell is meant, in particular, a shell which retains its shape when no forces other than gravity are acting on it.

Furthermore, the first and second shells can be provided in steps a) and c) such that the upper side and the lower side are formed curved. In addition, the first and second shells can be provided such that the side facing away from the upper side or the lower side respectively is formed curved. The curvature can be a spherical curvature, an aspherical curvature or another curvature.

The first shell can be provided in step a) such that the upper side is formed as a smooth surface except for the structured section.

In addition, after step b) at least one recess formed by the structured section can be filled with material up to the upper side. Preferably the same material of which the first shell is formed is used here.

The filling can be carried out in one step or in several filling steps. In particular, the filling is carried out such that there is a smooth continuous upper side. The filled structured section thus forms a continuous surface together with the rest of the upper side.

In the method according to certain embodiments, in step d) the adhesive layer can be applied to the entire upper side of the first shell and/or the entire lower side of the second shell. In particular, the structured section (preferably if it is filled with material up to the upper side) can also be provided with the adhesive layer.

The adhesive layer can be e.g. an optical adhesive or an optical cement. In particular, it can be an adhesive layer the adhesive or binding property of which is generated by activation. It can be a UV adhesive for example.

The first shell, which can also be called first partial body or first semi-finished product, can be produced from a first polymer material and the second shell, which can also be called second partial body or second semi-finished product, can be produced from a second polymer material. The first polymer material and the second polymer material can be in each case a thermoplastic material and/or a thermosetting material. As thermoplastic material, e.g., PMMA (polymethyl methacrylate, e.g. Plexiglas), PA (polyamides, e.g. Trogamid CX), COP (cyclo olefin polymers, e.g. Zeonex), PC (polycarbonate, poly(bisphenol A carbonate), e.g. Makrolon, in particular LQ 2647), LSR (Liquid Silicone Rubber, e.g. Silopren, Elastosil), PSU (polysulfone, e.g. Ultrason), PES (polyethersulfone) and/or PAS (poly(arylene sulfone)) can be used. As thermosetting material, e.g., ADC (allyl diglycol carbonate, e.g. CR-39), acrylates (e.g. Spectralite), PUR (polyurethanes, e.g. RAVolution), PU/PUR (polyureas, polyurethanes, e.g. Trivex), PTU (polythiourethanes, e.g. MR-8, MR-7) and/or polymers based on episulfide/polythiol (e.g. MR-174) can be used.

In particular, the optically effective structure can be completely embedded in the optical element, with the result that it does not extend to any outer boundary surface of the optical element. The optically effective structure is preferably smaller in its dimensions than the dimensions of the optical element. It can also be said that the optically effective structure is formed only in a part of the optical element. The embedded optically effective structure can have a maximum lateral dimension which is smaller than the maximum lateral dimension of the optical element. In particular, it can be smaller than 50% of the lateral dimension of the optical element, or also smaller than 40%, 30% or 20% of the lateral dimension of the optical element. The optically effective structure is thus preferably embedded in the optical element but only provided in part.

In the method according to certain embodiments, after step b) and before step d) a protective layer made of thermosetting material can be applied to the optically effective coating by pouring. For this, in particular the RIM process (Reaction Injection Moulding process) can be used. Here, e.g., two components can be mixed immediately before injection into a mould, with the result that the components can react with each other and form a desired chemically crosslinked polymer. The first shell is preferably positioned in a corresponding mould, with the result that the desired protective layer can be formed.

The optically effective structure can be formed, for example, as a reflective and/or diffractive structure. In particular, the optically effective structure can be formed as a partially reflective structure and/or wavelength-dependent reflective structure.

The formation of the first and/or second shell can, in particular, be carried out in each case in at least two successive partial steps. This leads to reduced shrinkage during the production of the first or second shell.

In the method according to certain embodiments, those materials the refractive indices of which differ by not more than 0.005 or 0.001 for at least one wavelength from the predetermined wavelength range can be used as first and second polymer material. In particular, the refractive indices can differ by not more than 0.0005. With such a small difference in refractive index, the boundary surface between the two polymer materials almost disappears optically for the predetermined wavelength range. In particular, the polymer materials can be chosen such that they have the same dispersion in the predetermined wavelength range.

The predetermined wavelength range can be the visible wavelength range, the near-infrared range, the infrared range and/or the UV range.

In order to provide the first shell according to step a) and the second shell according to step c), in each case a moulding process (such as e.g. injection moulding, injection compression moulding, RIM, casting), a forming process (such as e.g. thermoforming, hot embossing), a removal and/or cutting process (such as e.g. diamond turning, ion bombardment, etching) can be used. Of course, it is also possible to combine these processes for providing the first or second shell with each other.

The first shell and the second shell in each case are formed, in particular, as dimensionally stable semi-finished products, which are joined to each other by means of the adhesive layer.

In particular, the first shell can have an average thickness from the range of 2 mm-5 mm (e.g. 3.5 mm) and the second shell can have an average thickness from the range of from 0.15 mm to 2 mm or from the range of from 0.15 mm to 0.25 mm (e.g. 0.17 mm). The ratio of the average thickness of the first shell to the average thickness of the second shell can lie in the range of 5-40, 10-35, 15-25 or 18-22 (e.g. 20, 20.5 or 21).

The first shell can comprise an area at the edge (or a marginal area) which has a greater thickness than the average thickness of the first shell. The marginal area is preferably not taken into account in the determination of the average thickness of the first shell. In addition, the marginal area can be formed in one piece with the first shell or can be a separate element which is joined to the first shell. For example, the marginal area can be glued or cemented to the first shell. The marginal area can be formed such that it provides at least one further optical functionality. This can be, in particular, a diffractive and/or reflective optical functionality. In particular, the first shell, with the marginal area, can be formed such that it is L-shaped.

The application of the optically effective coating according to step b) can be effected, for example, by vapour deposition, sputtering, CVD (chemical vapour deposition), wet coating, etc. The coating can be a single layer. However, it is also possible to apply several layers. In particular, an interference layer system can also be applied. Furthermore, at least one layer for promoting adhesion, one layer for mechanical compensation and a protective layer (diffusion/migration, thermal protection, chemical protection, UV protection etc.) can additionally be applied. The optically effective coating can be designed for specific wavelengths or spectral ranges. Furthermore, the function thereof can additionally or alternatively be dependent on the angle of incidence, on the polarization and/or on further optical properties. The optically effective structure can be reflective, in particular highly reflective (e.g. mirror-like), partially transparent/partially reflecting and/or can provide a filter effect. Furthermore, the optically effective coating can be a diffractive optical element.

The optically effective coating can be applied only to the structured section. Alternatively it is possible to apply the optically effective coating over the whole surface and then to remove it in the surface sections which are not required. Chemical etching or ion etching e.g. can be used for such a removal.

At least one metal, at least one metal oxide or at least one metal nitride can be used for the optically effective coating. An organic material and/or a polymer material can also be used. Furthermore, so-called hybrid materials, such as e.g. organic-inorganic hybrid systems or organically modified silanes/polysiloxanes can be used.

In the method according to certain embodiments, steps a)-e) can be carried out such that the optically effective structure is completely embedded in the transparent body. The optically effective structure thus does not extend to any material boundary surface of the transparent body.

Furthermore, steps a)-e) can be performed such that the optically effective structure comprises surface pieces spaced apart from each other which provide the desired optical function. The surface pieces can be, for example, reflective surface pieces. The reflective surface pieces can bring about a complete reflection (almost 100%) or also only a partial reflection (partially reflective surface pieces). In particular, the reflective surface pieces do not lie in a common plane. They can be offset parallel to each other.

Together, the reflective surface pieces can provide a deflecting effect and, optionally, they can additionally also provide another imaging effect.

The surface pieces can in each case be formed separately as flat surface pieces or also as surface pieces formed curved.

Steps a)-e) and in particular steps a) and b) can also be performed such that the optically effective structure comprises precisely one single surface piece, which provides the desired optical function. The surface piece can be, for example, a reflective surface piece. It can bring about a complete reflection (almost 100%) or also only a partial reflection (partially reflective surface piece). The surface piece can be formed as a flat surface piece or as a curved surface piece. In particular, it can also have another imaging effect in addition to the deflecting effect, because of its formation (preferably its curved formation).

If the optically effective structure comprises precisely one single surface piece, the structured section in step a) can comprise precisely one single recess in the first shell. This recess can be filled with material up to the upper side. Preferably the same material of which the first shell is formed is used here.

The filling can be carried out in one step or in several filling steps. In particular, the filling is carried out such that there is a smooth continuous upper side. The filled structured section thus forms a continuous surface together with the rest of the upper side.

In the method according to certain embodiments, the optical element can be finished after step e) has been carried out. However, it is also possible to carry out at least one more material-removing processing step in order, for example, to machine or carve out the boundary surface of the second shell facing away from the first shell. The same applies to the boundary surface of the first shell facing away from the second shell.

Of course, at least one more surface-finishing method step can also be carried out, such as e.g. the application of an anti-reflection coating, a hard coating, etc. In particular, the finishing processes known from the manufacture of spectacle lenses can be carried out.

The finished optical element can thus be provided using the method according to the invention. However, it is also possible for yet more method steps to be necessary in order to finish the optical element such that it can be used for its intended use.

Furthermore, an optical element which is transparent in a predetermined wavelength range and in which an optically effective structure is embedded is provided, wherein the optical element is produced using the steps of the method according to the invention (including further developments thereof).

In particular, the optical element can be formed as a spectacle lens for a display device that can be fitted on the head of a user and generates an image and can comprise a front side and a rear side, a coupling-in section and a coupling-out section spaced apart from the coupling-in section and a light-guiding channel which guides light bundles of pixels of the generated image, which are coupled into the optical element via the coupling-in section of the optical element, in the optical element to the coupling-out section, by which they are coupled out of the spectacle lens, wherein the coupling-out section comprises the optically effective structure, which brings about a deflection of the light bundles for the coupling-out, and wherein the front side is formed by the side of the second shell facing away from the first shell and the rear side is formed by the side of the first shell facing away from the second shell.

The guiding of the light bundles in the light-guiding channel can be brought about, in particular, by one or more reflections or total internal reflections. The reflections or total internal reflections can be brought about on the front and rear side of the spectacle lens. However, it is also possible for one, several or all reflections to be brought about inside the spectacle lens. For this, one or two corresponding reflective layers can be provided.

In the optical element, the optically effective structure can comprise precisely one single reflective surface piece. The reflective surface piece can bring about a complete reflection (almost 100%) or also only a partial reflection.

The single reflective surface piece is preferably formed curved. Thus, in addition to the deflecting optical property, it can also have another imaging optical property.

Of course, it is also possible for the optically effective structure to comprise several reflective surface pieces. These are preferably spaced apart from each other. The several reflective surface pieces can separately be formed flat and/or curved. Furthermore, the several reflective surface pieces together can provide an imaging property. The several reflective surface pieces can in each case bring about a complete reflection (almost 100%) or also only a partial reflection (partially reflective surface pieces).

Furthermore, the disclosure includes a display device with a holder that can be fitted on the head of a user, an image-generating module, secured to the holder, which generates an image, and an imaging optical system, secured to the holder, which comprises an optical element according to the invention and which, when the holder is fitted on the user's head, images the generated image such that the user can perceive it as a virtual image.

The imaging optical system can comprise the optical element as the only optical element.

However, it is also possible for the imaging optical system to comprise, in addition to the optical element, at least one further optical element.

The display device can comprise a control unit which actuates the image-generating module.

The image-generating module can comprise, in particular, a two-dimensional imaging system, such as e.g. an LCD module, an LCoS module, an OLED module or a tilting mirror matrix. The imaging system can comprise a plurality of pixels, which can be arranged e.g. in rows and columns. The imaging system can be self-luminous or not self-luminous.

The image-generating module can, in particular, be formed such that it generates a monochromatic or a multi-coloured image.

The display device according to certain embodiments can comprise further elements known to a person skilled in the art which are necessary for its operation.

Furthermore, a method for producing the described display device is disclosed. The optical element according to certain embodiments is produced according to the production methods disclosed herein and the thus-produced optical element is combined (or assembled) with the further elements of the display device such that the display device according to the disclosed embodiments (including further developments thereof) is produced.

It is understood that the features named above and those yet to be explained below can be used not only in the stated combinations but also in other combinations or alone, without departing from the scope of the present invention.

BRIEF DESCRIPTION OF THE DRAWINGS

The invention is explained in yet more detail below by way of example with reference to the attached drawings, which also disclose features essential to the invention. For the sake of better clarity, a to-scale and proportional representation and shading are at least sometimes dispensed with in the figures.

Figure 1:
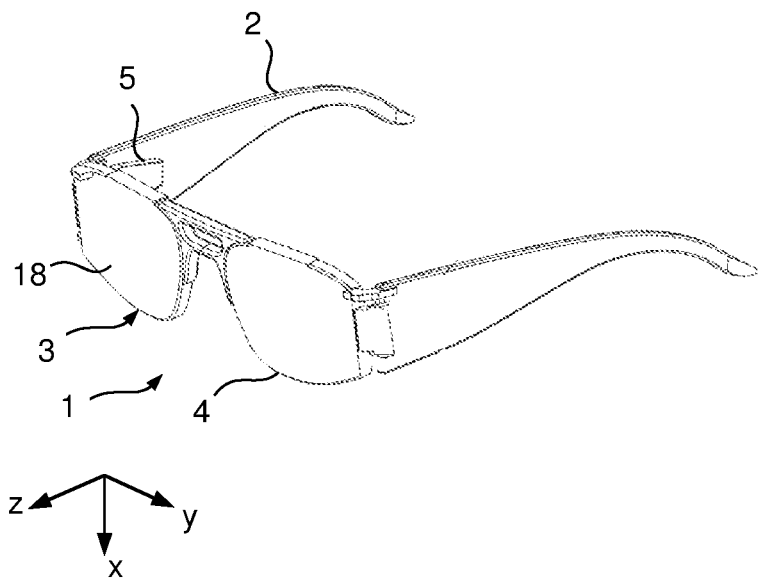
FIG. 1 is an embodiment of the display device in accordance with embodiments of the invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

In the embodiment shown in FIG. 1, the display device 1 according to the invention comprises a holder 2 that can be fitted on the head of a user and can be formed e.g. in the manner of a conventional spectacles frame, as well as a first and a second spectacle lens 3, 4, which are secured to the holder 2. The holder 2 with the spectacle lenses 3, 4 can be formed e.g. as sports glasses, sunglasses and/or glasses for correcting defective vision, wherein a virtual image can be reflected into the user's field of view via the first spectacle lens 3, as described below.

For this, the display device 1 comprises an image-generating module 5, which can be arranged in the area of the right-hand temple stem of the holder 2, as represented schematically in FIG. 1. The image-generating module 5 can comprise a two-dimensional image-generating element 6 (FIG. 2), such as e.g. an OLED, LCD or LCoS chip or a tilting mirror matrix, with a plurality of pixels arranged e.g. in columns and rows.

The spectacle lenses 3 and 4, and in particular the first spectacle lens 3, are described, only by way of example, together with the display device 1 according to the invention. The spectacle lenses 3, 4, or at least the first spectacle lens 3, are in each case formed separately as a spectacle lens 3, 4 according to the invention or as an optical element according to the invention. The optical element according to the invention can also be used in a connection other than with the display device 1 described here. Therefore, when it is formed as a spectacle lens, the optical element can, of course, also be formed as a second spectacle lens 4.

Figure 2:
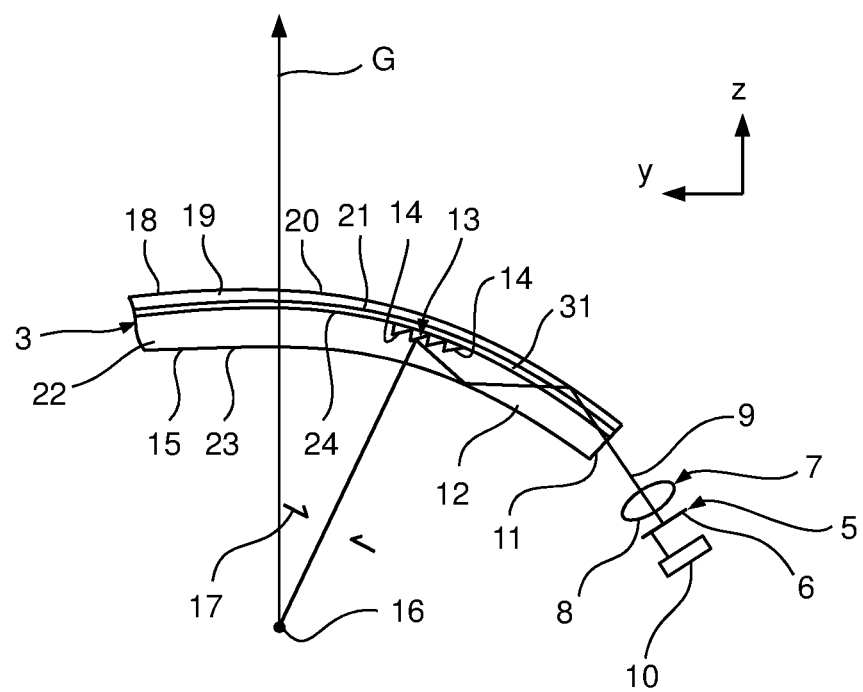
FIG. 2 is an enlarged partial sectional view of the optical element according to certain embodiments including a schematic representation of the image-generating module.

As can best be seen from the enlarged, schematic partial sectional view in FIG. 2, the display device 1 comprises an imaging optical system 7 which contains an optical element 8 arranged between the image-generating element 6, or the imaging system 6, and the first spectacle lens 3. In addition, the first spectacle lens 3 itself also acts as part of the imaging optical system 7.

A light bundle 9 can emerge from each pixel of the imaging system 6. The desired image can be generated by correspondingly actuating the pixels of the imaging system 6 by means of a control unit 10, which can be part of the image-generating module 5. In FIG. 2, the beam path of a light beam is drawn in to represent the light bundles 9, with the result that the light beam 9 is also discussed hereafter.

The light beam 9 emerging from the imaging system 6 runs through the optical element 8 and enters the first spectacle lens 3 via a coupling-in section 11 (here the end face of the first spectacle lens 3) and is guided in this along a light-guiding channel 12 up to a coupling-out section 13. The coupling-out section 13 comprises several reflective deflecting surfaces 14 arranged next to each other (which can also be called reflective facets), on which a reflection of the light beams 9 in the direction of a rear side 15 of the first spectacle lens 3 takes place, with the result that the light beams 9 exit the first spectacle lens 3 via the rear side 15. Alternatively, the coupling-out section 13 can comprise precisely one reflective deflecting surface 14.

Thus, when a user is wearing the display device 1 according to the invention on his head as intended, he can perceive the image generated by means of the imaging system 6 as a virtual image when he looks at the coupling-out section 13. In the embodiment described here, the user must look approx. 40° to the right with respect to the direction of view G of a forward view. In FIG. 2, for the purpose of illustration, the centre of rotation 16 of the eye of the user, as well as the eyebox 17 or the exit pupil 17 of the imaging optical system 7 are drawn in. The eyebox 17 is the area which is provided by the display device 1 and in which the user's eye can move and he can still always see the generated image as a virtual image.

Although the coupling-in is carried out via the end face of the first spectacle lens 3 in the described embodiment, and thus the coupling-in section 11 is formed on the end face of the first spectacle lens 3, it is also possible to carry out a coupling-in via the rear side 15 of the first spectacle lens.

As shown in the schematic representation in FIG. 2, both the rear side 15 and the front side 18 of the first spectacle lens 3 are formed curved.

The first spectacle lens 3 is, as can be seen in particular from the representations in FIG. 2, furthermore formed double-shelled and comprises an outer shell 19 with a first and second side 20 and 21 as well as an inner shell 22 with a first and second side 23 and 24.

The first side 20 of the outer shell 19 forms the front side 18 of the first spectacle lens 3 and the first side 23 of the inner shell 22 forms the rear side 15 of the first spectacle lens 3. The second side 21 of the outer shell 18 as well as the second side 24 of the inner shell 22, which face each other, have complementary curvatures and are joined to each other over their surfaces via an adhesive layer 31.

The light-guiding channel 12 is formed such that the desired guiding of the light beams 9 is effected from the coupling-in section 11 to the coupling-out section 13. This can be effected e.g. by total internal reflection on the front side 18 (=first side 20 of the outer shell 19) and on the rear side 15 (=first side 23 of the inner shell 22). Of course, it is also possible for a reflective coating which brings about the desired reflection of the light beams 9 to be formed on the front side 18 and/or on the rear side 15 in the area of the light-guiding channel 12. The reflectivity of the reflective coating can be e.g. as great as possible (approx. 100%) or smaller. The reflective coating can thus be formed as a mirror layer or as a partially reflective layer.

In the embodiment described here, both sides 20, 21 of the outer shell 19 are spherically curved and the first side 20 of the outer shell 19 has a radius of curvature of 94 mm and the second side 21 of the outer shell 19 has a radius of curvature of 92 mm. The thickness of the outer shell is thus 2 mm. However, the outer shell 19 can also be formed with a small thickness. The thickness of the outer shell 19 can thus lie in the range of from 0.15 mm to smaller than 2 mm. In particular, the outer shell 19 can be formed as a dimensionally stable film. By dimensionally stable is meant here, in particular, that the film withstands gravity at least and thus retains its shape when no other forces are acting on it.

The second side 24 of the inner shell 22 is spherically curved and has a radius of curvature which corresponds to the radius of the second side 21 of the outer shell 19. This is thus a radius of 92 mm here. The first side 23 of the inner shell 22 is spherically curved and has the radius of curvature necessary for correcting the user's defective vision (e.g. 150 mm when PMMA is used as material for the inner shell 22). Of course, the first side 23 of the inner shell can also be aspherically curved. The material of the outer shell 19 is preferably the same as the material of the inner shell 22. The thickness of the inner shell 22 substantially depends on the difference between the radius of the second side 24 of the inner shell 22 and the first side 23 of the inner shell 22 and in the example described here is approx. 3 mm.

As already mentioned, the materials of the inner and outer shells 22 and 19 are preferably the same, with the result that they have an identical refractive index. The inner and outer shells 22 and 19 are preferably glued together over the whole surface via the adhesive layer, with the result that a compact first spectacle lens 3 is provided.

The first spectacle lens 3 of the embodiment described here provides a correction of +2 dioptres.

The optical element according to the invention can be produced as follows.

Figure 3:
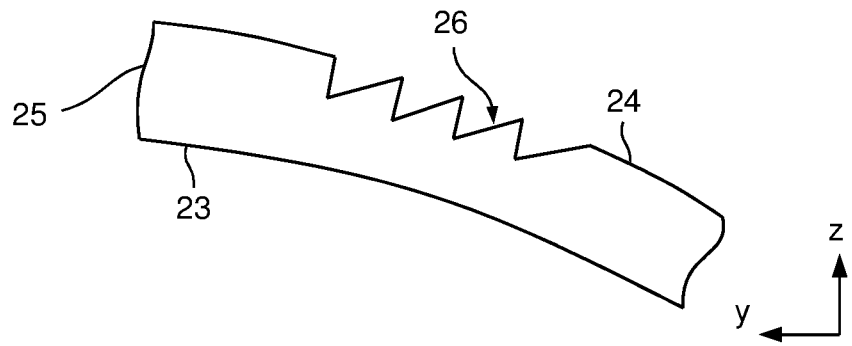
FIGS. 3-7 are partial sectional views to explain the production of the optical element according to certain embodiments.

In a first step, a first semi-finished product 25 is produced by injection moulding from a thermoplastic polymer. As shown in the enlarged partial sectional view of FIG. 3, the first semi-finished product 25 comprises the first side 23 and the second side 24. On the second side 24, a microstructuring 26 is formed which predefines the shape of the desired reflective facets 14.

Figure 4:
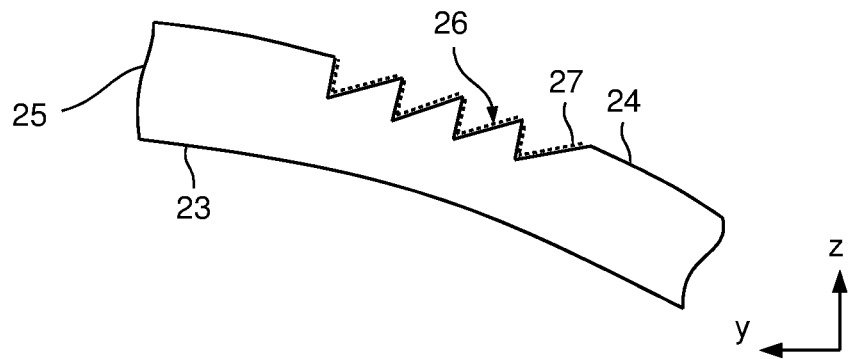

The first semi-finished product 25 is then coated in the area of the microstructuring 26 with an optically effective layer 27, which is represented by a dashed line (to simplify the representation, in FIG. 2 the layer 27 is not drawn in). For this, known coating methods can be used, such as e.g. chemical vapour deposition (CVD) or physical vapour deposition (PVD). The optically effective layer 27, which is represented dashed in FIG. 4, is chosen such that the described relative facets 14 are provided.

Figure 5:
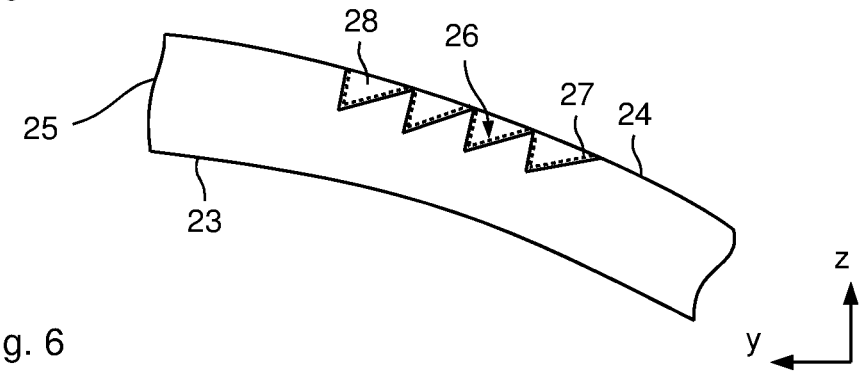

The recesses present because of the microstructuring 26, which extend from the second side 24 into the semi-finished product 25, are filled in a subsequent step such that a smooth continuous second side 24 results (FIG. 5). To fill the recesses, the same material 28 as the material for producing the semi-finished product 25 or also an optical cement or optical adhesive 28 can be used.

Figure 6:
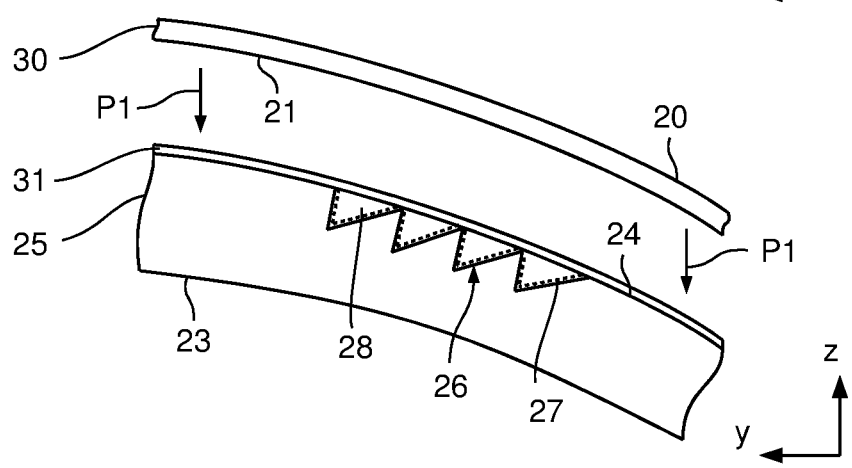
Figure 7:
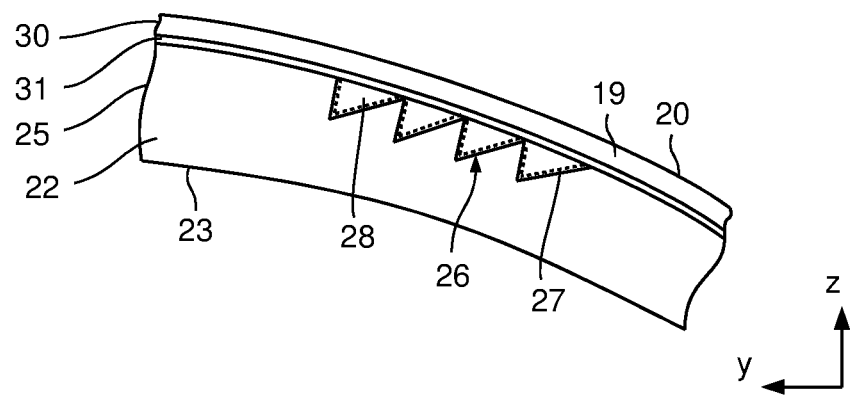

The outer shell 19 is then produced as second semi-finished product 30 by injection moulding from a thermoplastic polymer such that it comprises the first and second sides 20, 21. The second semi-finished product 30 can alternatively be produced before the production of the first semi-finished product 25 or at the same time as the first semi-finished product 25. This second semi-finished product 28 is then glued to the first semi-finished product 25 over the whole surface. For this, the second side 21 of the second semi-finished product 30 and/or the second side 24 of the first semi-finished product 25 can be coated with an optical adhesive or an optical cement, in order to form an adhesive layer 31. In FIG. 6 the case is shown in which the second side 24 of the first semi-finished product 25 is coated with the adhesive layer 31. The two semi-finished products are then brought into contact with each other on their surfaces 21 and 24 via the adhesive layer 31, as indicated by the arrows P1 in FIG. 6, and the adhesive layer 31 is cured in order thus to produce the optical element 3 according to the invention, as shown in FIG. 7. The optical element 3 according to the invention is thus present, which is constructed double-shelled, wherein the outer sides 23 and 20 of the two shells 19 and 22 form the rear side 15 and the front side 18 of the first spectacle lens 3.

Different materials can be used as material for the two semi-finished products 25 and 30. However, preferably the same material is used for both semi-finished products 25 and 30. In particular, thermoplastic polymers and/or thermosetting polymers are used.

As thermoplastic polymers, e.g., PMMA (polymethyl methacrylate, e.g. Plexiglas), PA (polyamides, e.g. Trogamid CX), COP (cyclo olefin polymers, e.g. Zeonex), PC (polycarbonate, poly(bisphenol A carbonate), e.g. Makrolon), LSR (Liquid Silicone Rubber, e.g. Silopren, Elastosil), PSU (polysulfone, e.g. Ultrason), PES (polyethersulfone) and/or PAS (poly(arylene sulfone)) can be used. As thermosetting polymers, e.g., ADC (allyl diglycol carbonate, e.g. CR-39), acrylates (e.g. Spectralite), PUR (polyurethanes, e.g. RAVolution), PU/PUR (polyureas, polyurethanes, e.g. Trivex), PTU (polythiourethanes, e.g. MR-8, MR-7) and/or polymers based on episulfide/polythiol (e.g. MR-174) can be used.

Figure 8:
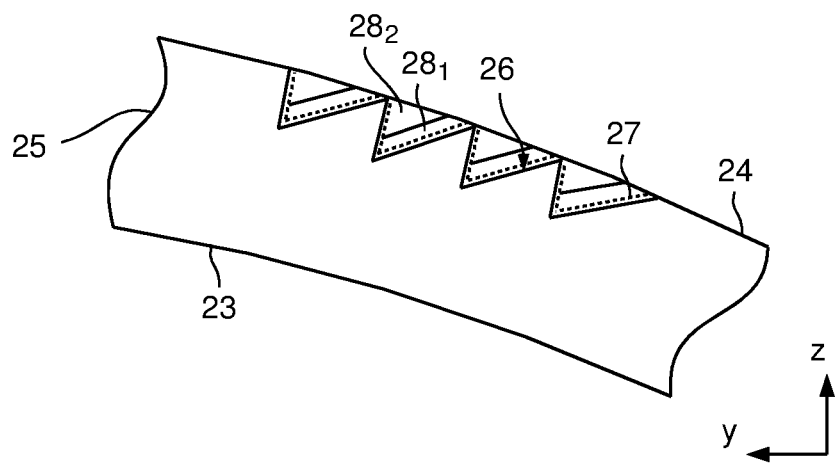
FIG. 8 is a partial sectional view to explain an alternative manner of producing the optical element according to certain embodiments.

In FIG. 8, the first semi-finished product 25 with the microstructuring 26 and the optically effective layer 27 is shown in an enlarged sectional representation. Unlike the previously described filling of the microstructuring 26 in one step, this is carried out in two steps in the variant according to FIG. 8. An undesired shrinkage, which can occur during curing of the material of the fill layers $28_1$, $28_2$ (fill layer $28_1$ and then fill layer $28_2$), can thus be reduced. Of course, the filling can also be carried out in more than two steps, e.g. in three, four, five or six steps.

In the display device 1 according to the invention, the reflection of the virtual image into the user's field of view is effected via the first spectacle lens 3. Of course, a reflection via the second spectacle lens 4 is also possible. In addition, the display device 1 can be formed such that items of information or virtual images are reflected in via both spectacle lenses 3, 4. Here, the reflection can be effected such that a three-dimensional image impression forms. However, this is not strictly necessary.

The spectacle lenses 3, 4 can have a refractive power of zero or a refractive power other than zero (in particular for correction of defective vision). As shown in the figures, both the front side 11 and the rear side 12 of the spectacle lens 3 are formed curved. The front side 11 can, in particular, be spherically curved. If the spectacle lens has a refractive power other than zero, in order to correct defective vision, as a rule the curvature of the rear side 15 is chosen correspondingly, in order to achieve the corresponding correction. The rear side 15 can have a curvature deviating from the spherical shape.

The holder 2 need not be formed as a spectacles-type holder. Any other type of holder with which the display device can be fitted or worn on the user's head is also possible.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. A method for producing an optical element which is transparent in a predetermined wavelength range and in which an optically effective structure is embedded, the method comprising:
   a) providing a first shell which is transparent in the predetermined wavelength range and which is formed in one piece and comprises a structured section on an upper side thereof with the upper side defining a smooth surface except for the structured section;
   b) applying a coating which is optically effective for the predetermined wavelength range onto the structured section in order to form the optically effective structure;
   c) providing a second shell which is transparent in the predetermined wavelength range and which is formed in one piece and comprises a lower side that is smooth and which has a shape that complements a shape of the upper side;
   d) applying an adhesive layer which is transparent in the predetermined wavelength range onto at least one of the upper side of the first shell and the lower side of the second shell; and
   e) joining the upper side of the first shell to the lower side of the second shell via the adhesive layer such that a two-shell optical element is formed in which the optically effective structure is buried,
   wherein after step b) at least one recess formed by the structured section is filled with a material up to the upper side such that the material is located between the coating and the adhesive layer.

2. The method according to claim 1, wherein the first and second shells are provided in steps a) and c) in each case as a dimensionally stable shell.

3. The method according to claim 1, wherein the first and second shells are provided in steps a) and c) such that the upper side and the lower side are curved.

4. The method according to claim 1, wherein steps a) and b) are performed such that the optically effective structure comprises a plurality of reflective surface pieces spaced apart from each other.

5. The method according to claim 1, wherein steps a) and b) are performed such that the optically effective structure is one reflective surface piece.

6. The method according to claim 1, wherein, in step d), the adhesive layer is applied onto an entirety of at least one of the upper side of the first shell and the entire lower side of the second shell.

7. A two-shell optical element, comprising:
   a first shell; and
   a second shell,
   wherein each of the first and second shells are directly joined to each other via an adhesive layer,
   wherein an optically effective structure is embedded in the optical element,
   wherein the first shell is transparent in a predetermined wavelength range,
   wherein the first shell is formed as a single body,
   wherein the optically effective structure comprises a coating, which is optically effective for the predetermined wavelength range, applied onto a structured section of the first shell that is defined along a portion of an upper side of the first shell,
   wherein at least one recess defined in the structured section is filled with a material up to the upper side such that the material is located between the coating and the adhesive layer,
   wherein the upper side of the first shell defines a smooth surface except for the structured section,
   wherein the second shell is a single body, is transparent in the predetermined wavelength range, and comprises a lower side that is smooth and which has a shape that complements a shape of the upper side of the first shell,
   wherein the upper side of the first shell is joined to the lower side of the second shell via the adhesive layer such that a two-shell optical element is formed in which the optically effective structure is buried.

8. The two-shell optical element of claim 7, wherein the optically effective structure is one single reflective surface piece.

9. The two-shell optical element of claim 8, wherein the reflective surface piece is formed curved.

10. The two-shell optical element of claim 7, wherein the two-shell optical element is formed as a spectacle lens for a display device that can be fitted on the head of a user and generate an image,
    wherein the spectacle lens comprises:
      a front side and a rear side,
      a coupling-in section and a coupling-out section spaced apart from the coupling-in section, and
      a light-guiding channel that is suitable for guiding light bundles of pixels of the generated image, which are coupled into the optical element via the coupling-in section of the optical element, in the optical element to the coupling-out section, by which they are coupled out of the optical element,
      wherein the coupling-out section comprises the optically effective structure, which brings about a deflection of the light bundles for the coupling-out, and
      wherein the front side is formed by the side of the second shell facing away from the first shell and the rear side is formed by the side of the first shell facing away from the second shell.

11. A display device, comprising:
    a holder that can be fitted on the head of a user;
    an image-generating module, secured to the holder, which generates an image; and
    an imaging optical system, secured to the holder, which comprises
      the spectacle lens according to claim 10 and which, when the holder is fitted on the head of the user, images the generated image such that the user can perceive it as a virtual image.

* * * * *